(12) United States Patent
Thompson

(10) Patent No.: US 12,543,811 B2
(45) Date of Patent: Feb. 10, 2026

(54) BRIM CLIP

(71) Applicant: Lisa Thompson, Brookfield, WI (US)

(72) Inventor: Lisa Thompson, Brookfield, WI (US)

( * ) Notice: Subject to any disclaimer, the term of this patent is extended or adjusted under 35 U.S.C. 154(b) by 83 days.

(21) Appl. No.: 18/743,012

(22) Filed: Jun. 13, 2024

(65) Prior Publication Data

US 2024/0415221 A1 Dec. 19, 2024

Related U.S. Application Data

(60) Provisional application No. 63/472,630, filed on Jun. 13, 2023.

(51) Int. Cl.
| | |
|---|---|
| G09F 23/00 | (2006.01) |
| A42B 1/248 | (2021.01) |
| G09F 3/06 | (2006.01) |

(52) U.S. Cl.
CPC ............ *A42B 1/248* (2013.01); *G09F 3/06* (2013.01); *G09F 23/00* (2013.01)

(58) Field of Classification Search
CPC ............ A42B 1/248; G09F 3/06; G09F 23/00
See application file for complete search history.

(56) References Cited

U.S. PATENT DOCUMENTS

| | | | | |
|---|---|---|---|---|
| 10,465,887 | B1 * | 11/2019 | Levy | F21V 21/0965 |
| 12,016,477 | B1 * | 6/2024 | Wong | A45F 5/00 |
| 2002/0042941 | A1 * | 4/2002 | Grundy | A42B 1/248 |
| | | | | 40/329 |
| 2013/0173501 | A1 * | 7/2013 | Wrubel | G06Q 99/00 |
| | | | | 63/40 |
| 2015/0358515 | A1 * | 12/2015 | Resnick | G03B 17/561 |
| | | | | 24/3.12 |
| 2018/0193710 | A1 * | 7/2018 | Jernigan | A63B 57/203 |
| 2019/0116906 | A1 * | 4/2019 | Volmer | A42B 1/245 |
| 2019/0142096 | A1 * | 5/2019 | Skinner | A42B 1/0181 |
| | | | | 2/175.6 |
| 2019/0360807 | A1 * | 11/2019 | Chapman | G01C 17/28 |
| 2021/0346759 | A1 * | 11/2021 | Blose | A63B 69/3608 |
| 2022/0095820 | A1 * | 3/2022 | Marshall | F16B 5/121 |
| 2022/0128836 | A1 * | 4/2022 | Finley, III | A42B 1/247 |
| 2023/0366919 | A1 * | 11/2023 | Maus | G01R 29/12 |

* cited by examiner

*Primary Examiner* — Gary C Hoge
(74) *Attorney, Agent, or Firm* — John F. Vadopia

(57) ABSTRACT

A brim clip includes a plate-like member formed with an advertising logo side surface and an underside surface opposite the advertising log side surface, the plate-like member extending from a first end to an opposing second end and a clasp member including first, second and third portions. The first portion of the clasp member is inlayed into and attached to the underside surface of the plate-like member, which first portion extends from a first-portion front end arranged at or near the first end of the plate-like member and extending to a first portion back end. The second portion of the clasp member includes a first end that extends from the first portion back end at an angle x to a second end of the second portion, slightly upwards from the first portion back end towards the underside surface.

17 Claims, 5 Drawing Sheets

BRIM CLIP

CROSS-REFERENCE TO RELATED APPLICATIONS

Figure 1A:
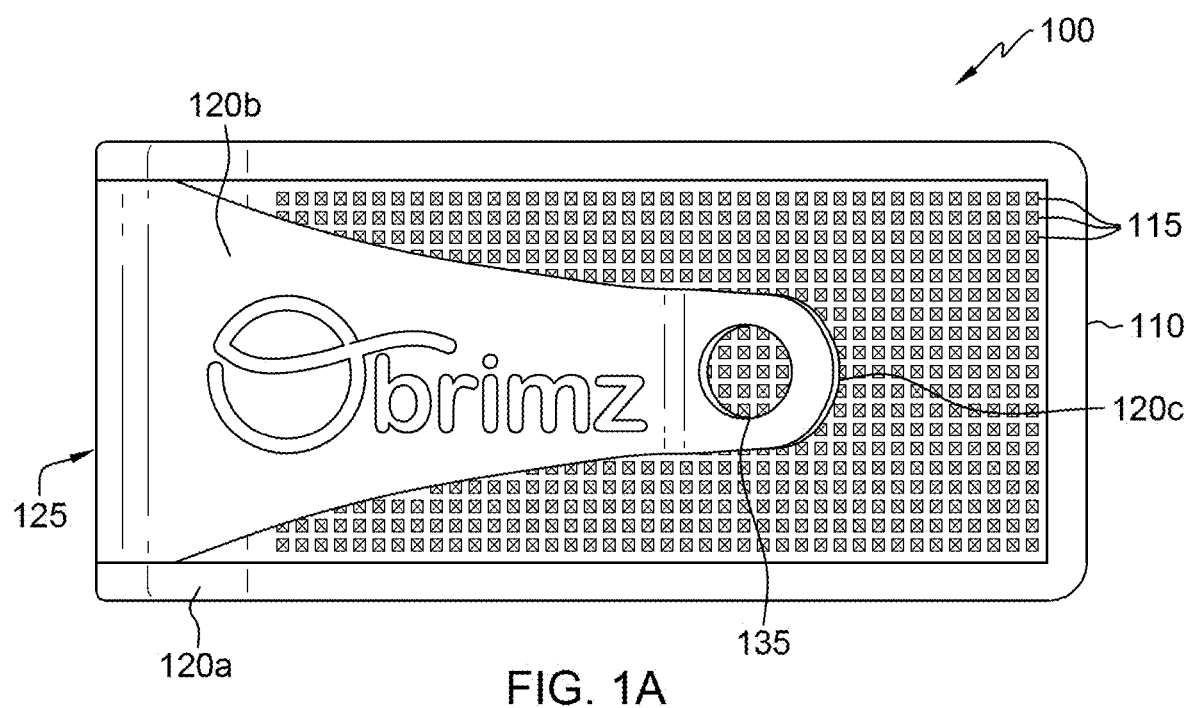

This application claims priority under 35 USC § 119 (e) from U.S. Provisional Patent Application No. 63/472,630, filed on Jun. 13, 2023 ("the provisional application"); the content of the provisional application is incorporated herein by reference.

BACKGROUND OF THE INVENTION

The present invention relates broadly to clips for mounting upon hats including caps. More specifically, the invention provides an ornamental brim clip with a proprietary logo display area and a hat-grip arrangement that maintains the brim clip securely where it is positioned on a hat brim for optimal visibility of the proprietary logo.

Hats, such as baseball caps, can include a brim upon which accessories, such as clips may be mounted. Cap brims are sometimes referred to as "bills." Such brims or bills typically have a front edge that has an edge curvature ("front-to-back") of a certain radius, as well as a thickness. The brim may also have a transverse curvature (also known as a "bend") of a certain radius.

SUMMARY OF THE INVENTION

The present invention provides a brim clip for a head gear such as hats and caps, i.e., a clip adapted for attachment to a hat brim, such as a baseball cap brim, and like wearable accessories and garments. The inventive brim clip is a perfect accompaniment for hats and caps, but also is intended to be used with skull caps, winter hats, bandanas, bags, straps, backpacks, purse straps, etc., without limitation. For that matter, the inventive brim cap includes a through hole in the clip portion that allows the brim clip to be attached to a necklace chain or lanyard. The through hole also facilitates secure attachment to a bag or backpack.

In an embodiment, the invention provides a brim clip includes a plate-like member formed with an advertising logo side surface and an underside surface opposite the advertising log side surface, the plate-like member extending from a first end to an opposing second end and a clasp member including first, second and third portions. The first portion of the clasp member is inlayed into and attached to the underside surface of the plate-like member, which first portion extends from a first-portion front end arranged at or near the first end of the plate-like member and extending to a first portion back end. The second portion of the clasp member includes a first end that extends from the first portion's back end at an angle x to a second end of the second portion, slightly upwards from the first portion back end towards the underside surface. The third portion of the clasp member extends from a third portion front end at the second end of the second portion towards a third portion back end. The third portion of the clasp member includes an opening or through-hole by which wires, strings and/or chains are attached to the brim clip.

The first portion of the clasp member preferably includes a bend proximate the first portion back end. The bend is included in the plate-like member proximate the second end. At least one of surfaces of the first, second and third portions of the clasp member are textured surfaces. The angle x is between 5 degrees and 45 degrees. Preferably, the angle x is 20 degrees. A thickness of the logo is between 0.2 and 0.75 mm; preferably, the thickness of the logo is 0.40 mm. A radius of curvature of the bend at the first portion back end is between R5.00 and R10.00, and preferably R7.00. A length of the clasp member from the bend is between 10 and 40 mm, preferably 20 mm.

The third portion of the clasp member extends from the third portion front end at and an off angle of 5 to 45 degrees away from the underside surface of the plate-like member. The off angle is fifteen (15) degrees. The off-angle of the third portion of the clasp member may form an opening for receiving a cap brim. Textured surface or surfaces of the clasp member is/are scoured or otherwise formed to create cuts or channels bounding or defining squares that effect grip ability by increasing surface friction. A textured surface or surfaces of the clasp member is/are scoured or otherwise formed as circles, triangles, rectangles, and/or pentangles.

BRIEF DESCRIPTION OF THE DRAWING FIGURES

Figure 1B:
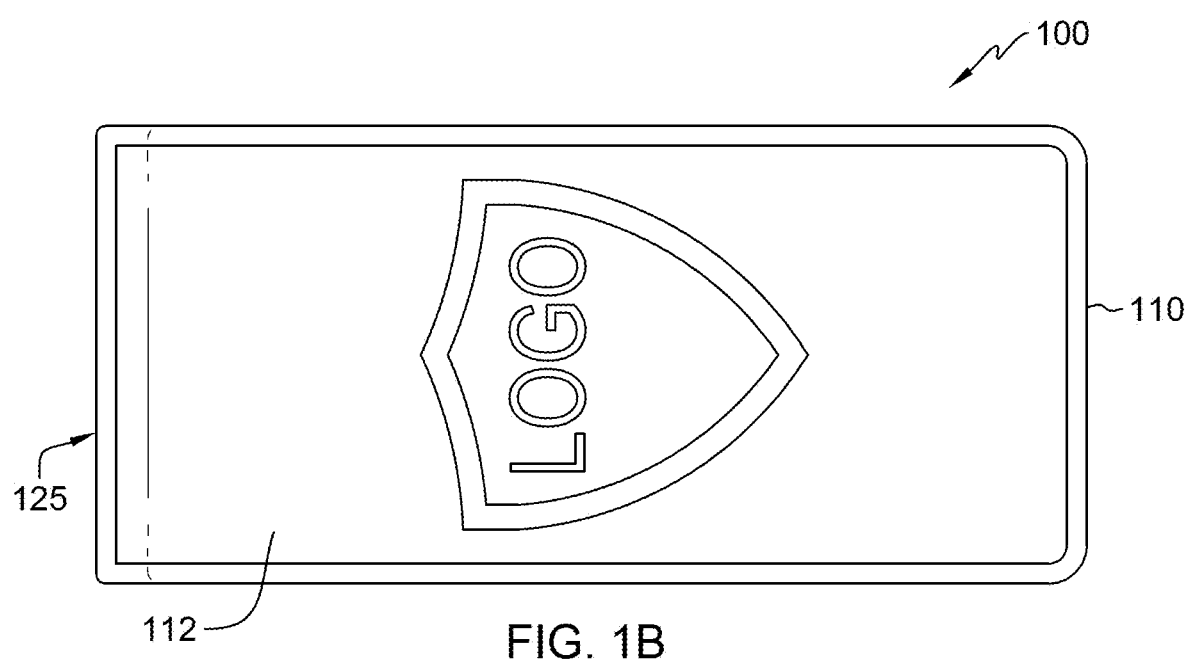
Figure 2:
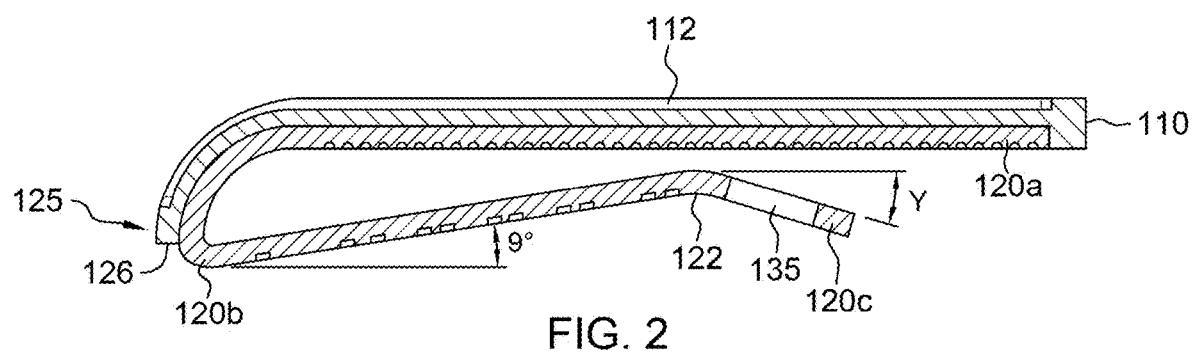
Figure 3B:
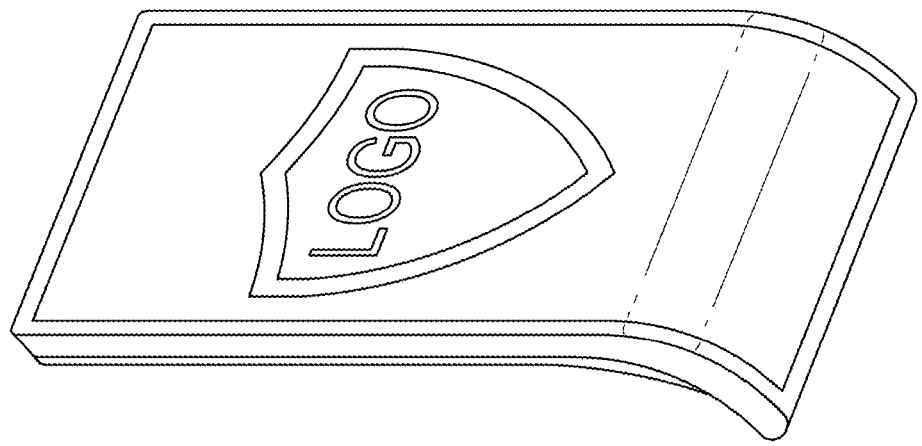
Figure 3A:
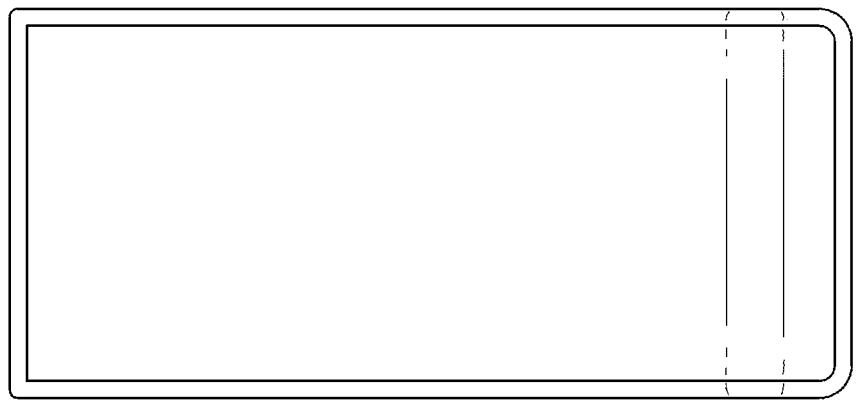
Figure 3C:
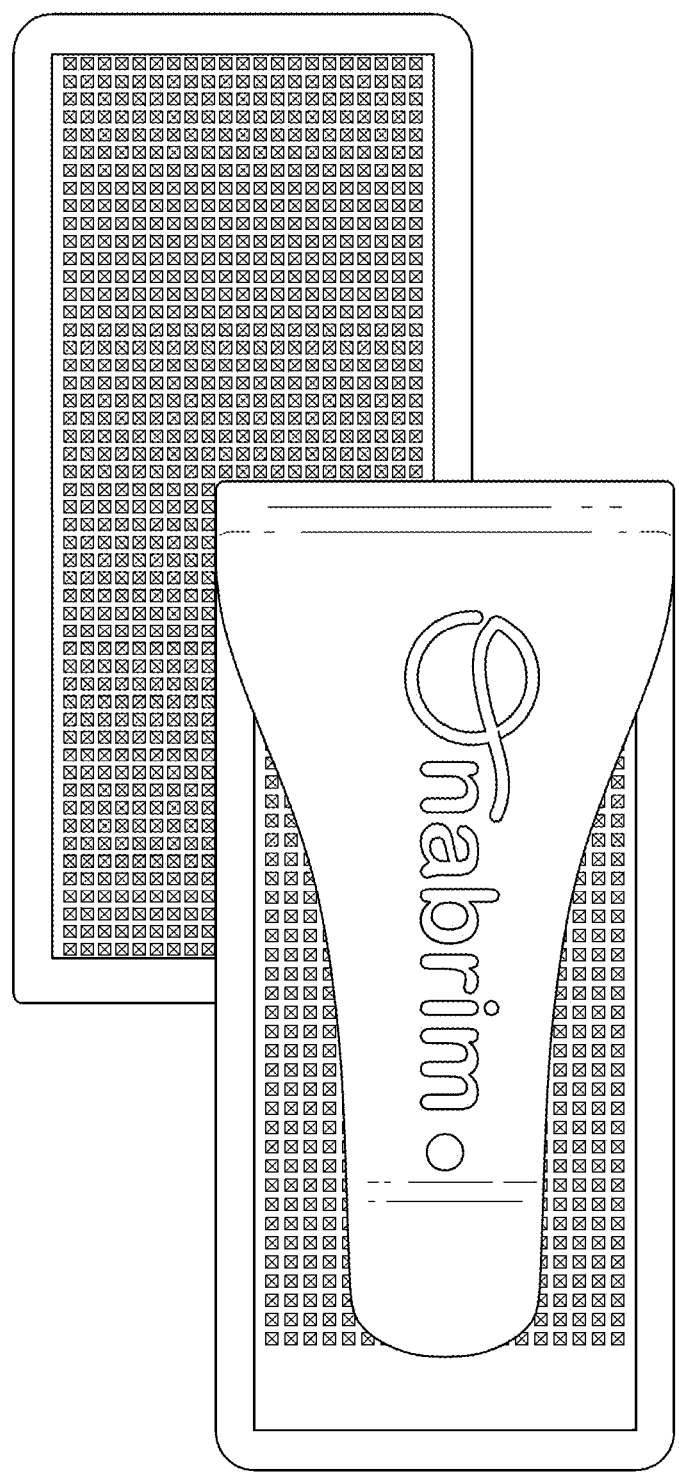
Figure 3D:
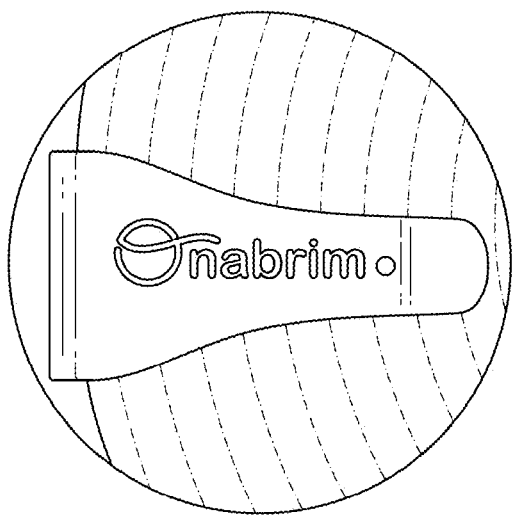
Figure 3E:
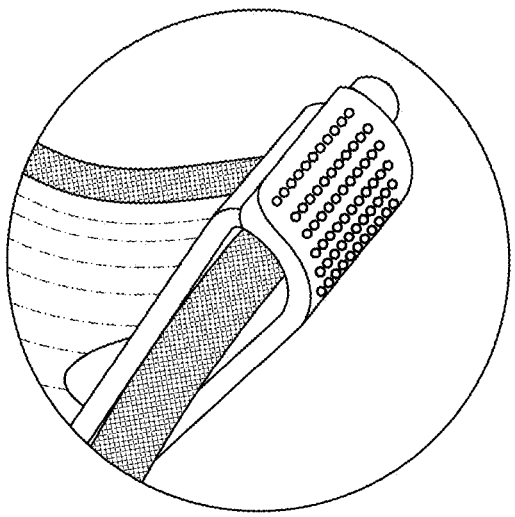
Figure 3F:
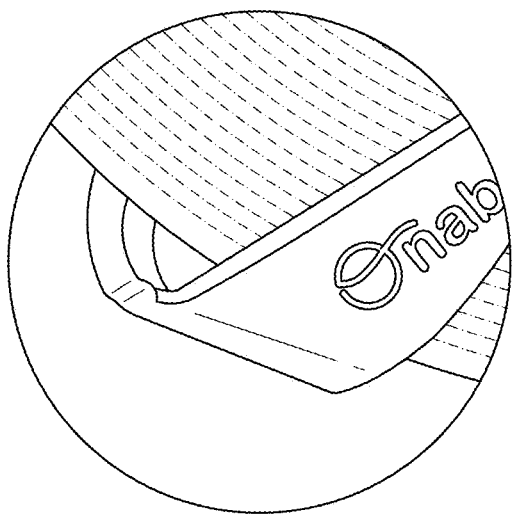

Further features and advantages of the invention will become apparent from the description of embodiments that follows, with reference to the attached figures, wherein:

FIG. 1A presents a plan clip side view of a brim clip of the invention;

FIG. 1B presents a plan logo side view of the brim clip of FIG. 1A;

FIG. 2 presents a plan side view of the brim clip of FIG. 1A;

FIG. 3a presents a plan view of a greppable side of the plate like member of the brim clip of FIG. 1A;

FIG. 3b presents a perspective view of the brim clip highlighting the curved edge or D-bend of the logo side of the brim clip of FIG. 1A;

FIG. 3c presents a plan view of the clip side of a brim clip, which is superimposed on a greppable side surface attached to the clip side of the plate-like member to highlight the greppable texture formed thereon;

FIG. 3d presents a plan view of the clip side of the brim clip to highlight the dimensions of the clip;

FIG. 3e presents a perspective view of the brim clip that highlights the D-shaped clasp design; and FIG. 3f presents a perspective view of the clip side of the brim clip to make clear that the thickness of the material forming the clasp is 1 mm, in the embodiment shown.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art.

FIG. 1A presents a clip side view of a first exemplary embodiment of a brim clip 100 of the invention. The brim clip 100 is formed with a plate-like member 110, having an advertising logo side surface (or inlay side) 112 (see FIG. 1B). The advertising logo side surface or inlay side 112 extends to a bend 125, where the bend 125 extends to and ends at point 126 (FIG. 2). Attached to or inlayed into the underside of plate-like member 110 is a first portion of a clasp member. The first portion 120a of the clasp member is attached to and follows the length of the plate-like member to its end 126, including the D-bend portion 125. A second portion 120b of the clasp member extends from a first clasp bend proximate the end 126 of the advertising logo side surface 120*a* of the plate-like member 110, the first clasp bend at an off-angle (angle x) so the second portion 120*b* extends slightly up from the horizontal towards a (textured) surface of the first portion 120*a* to a second clasp bend 122. A third portion or tip 120*c* extends at an off-angle (angle y) slightly down and away from the textured surface of the first portion to realize an opening for receiving a cap brim.

The first portion of the clasp member 120*a* has an exposed surface formed with a grippable texture; the opposite surface/side is attached to the side of the plate-like member 110 that is opposite the logo side 112. In this case, the surface of the first portion of the clasp member 120*a* is scoured or otherwise formed to create cuts or channels bounding or defining "squares" 115 that effect gripability (friction). Please note that while the embodiment shown enhances the gripability using a pattern of squares, the invention is not limited thereto. Any other surface texture (e.g., squares, circles, triangles, rectangles, pentangles, etc.) that facilitates gropability may be formed on the surface of the first portion of the clasp member 120*a* without deviating from the scope and spirit of the invention. An opening or hole 135 allows for wires, strings, chains, etc. to the inventive brim clip 100

The widths of the plate-like member 100 with the first portion of the clasp member 120*a* and the logo 112 attached are presented in FIG. 2. The thickness of the logo 112 is 0.40 mm. The radius of curvature of the bend at the distal ends of the plate-like member 110, the logo 112 and the bent part of the first portion 120*a* is R7.00. The angle x is the angle at which the second portion 120*b* bends inside towards the surface 120*a* and the angle Y is the angle at which the third portion bends away from the surface 120*a*. The length of the clasp from bend 126 is 20 mm.

As will be evident to persons skilled in the art, the foregoing detailed description, applications and figures are presented as examples of the invention, and that variations are contemplated that do not depart from the fair scope of the teachings and descriptions set forth in this disclosure. For example, the dimensions disclosed herein are for exemplary purposes only and should not be said to limit a scope of claims that might eventually issue that reflect the inventive subject matter herein.

What is claimed is:

1. A brim clip, comprising:
    a plate-like member formed with an advertising logo side surface and an underside surface opposite the advertising log side surface, the plate-like member extending from a first end to an opposing second end; and
    a clasp member including first, second and third portions;
    wherein the first portion of the clasp member is inlayed into and attached to the underside surface of the plate-like member, which first portion extends from a first-portion front end arranged at or near the first end of the plate-like member and extending to a first portion back end;
    wherein the second portion of the clasp member includes a first end that extends from the first portion back end at an angle x to a second end of the second portion, slightly upwards from the first portion back end towards the underside surface;
    wherein the third portion of the clasp member extends from a third portion front end at the second end of the second portion towards a third portion back end; and
    wherein the third portion of the clasp member includes an opening or through-hole by which wires, strings and/or chains are attached to the brim clip.

2. The brim clip of claim 1, wherein the first portion of the clasp member includes a bend proximate the first portion back end.

3. The brim clip of claim 2, wherein the bend is included in the plate-like member proximate the second end.

4. The brim clip of claim 1, wherein at least one of surfaces of the first, second and third portions of the clasp member are textured surfaces.

5. The brim clip of claim 1, wherein the angle x is between 5 degrees and 45 degrees.

6. The brim clip of claim 5, wherein the angle x is 20 degrees.

7. The brim clip of claim 1, wherein a thickness of the logo is between 0.2 and 0.75 mm.

8. The brim clip of claim 7, wherein the thickness of the logo is 0.40 mm.

9. The brim clip of claim 1, wherein the radius of curvature of the bend at the first portion back end is between R5.00 and R10.00.

10. The brim clip of claim 9, wherein the radius of curvature of the bend at the first portion back end is R7.00.

11. The brim clip of claim 1, wherein a length of the clasp member from the bend is between 10 and 40 mm.

12. The brim cap of claim 11, wherein the bend is 20 mm.

13. The brim clip of claim 1, wherein the third portion of the clasp member extends from the third portion front end at and an off angle of 5 to 45 degrees away from the underside surface of the plate-like member.

14. The brim clip of claim 13, wherein the off angle is fifteen (15) degrees.

15. The brim clip of claim 13, wherein the off-angle of the third portion of the clasp member forms an opening for receiving a cap brim.

16. The brim clip of claim 1, wherein textured surface or surfaces of the clasp member is/are scoured or otherwise formed to create cuts or channels bounding or defining squares that effect grip ability by increasing surface friction.

17. The brim clip of claim 1, wherein a textured surface or surfaces of the clasp member is/are scoured or otherwise formed as circles, triangles, rectangles, and/or pentangle.

* * * * *